United States Patent
Takemura et al.

(10) Patent No.: US 9,294,643 B2
(45) Date of Patent: Mar. 22, 2016

(54) IMAGE FORMING APPARATUS AND IMAGE FORMING METHOD

(71) Applicant: KYOCERA Document Solutions Inc., Osaka-shi, Osaka (JP)

(72) Inventors: Masataka Takemura, Osaka (JP); Hiroshi Yokota, Osaka (JP); Kunihiko Tanaka, Osaka (JP); Shinji Hayashi, Osaka (JP); Seiki Satomi, Osaka (JP); Masaki Miyashita, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 14/751,157

(22) Filed: Jun. 26, 2015

(65) Prior Publication Data

US 2015/0381840 A1 Dec. 31, 2015

(30) Foreign Application Priority Data

Jun. 27, 2014 (JP) ................. 2014-132457

(51) Int. Cl.
G06K 15/00 (2006.01)
H04N 1/00 (2006.01)
G06F 3/12 (2006.01)

(52) U.S. Cl.
CPC ....... *H04N 1/00875* (2013.01); *H04N 1/00204* (2013.01); *H04N 1/00347* (2013.01); *H04N 1/00854* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,307,640 B1* | 10/2001 | Motegi | .................. | G06F 21/608 358/1.14 |
| 2010/0182624 A1* | 7/2010 | Murakami | ............ | G06F 3/1204 358/1.9 |
| 2010/0225947 A1* | 9/2010 | Yoshida | .................. | G06F 21/35 358/1.13 |
| 2012/0148323 A1* | 6/2012 | Shimada | ................ | G06F 3/1204 400/76 |
| 2014/0253943 A1* | 9/2014 | Mandaknale | ...... | G06K 15/4095 358/1.14 |

FOREIGN PATENT DOCUMENTS

JP 2007160889 A 6/2007

* cited by examiner

*Primary Examiner* — Dov Popovici

(57) ABSTRACT

An image forming apparatus includes a determination section, acquisition section, generation section, notification section, and a management section. The determination section determines, when receiving a print job from a predetermined terminal apparatus via a network, whether or not the print job is a private print job. If the print job is a private print job, the acquisition section acquires, from another image forming apparatus coupled to the image forming apparatus to communicate with the image forming apparatus, information regarding the another image forming apparatus. The generation section generates a one time password on the basis of the acquired information. The notification section notifies the terminal apparatus of the generated one time password. The management section manages the generated one time password in association with the private print job and, when receiving the one time password from a user, executes the private print job associated with the one time password.

3 Claims, 3 Drawing Sheets

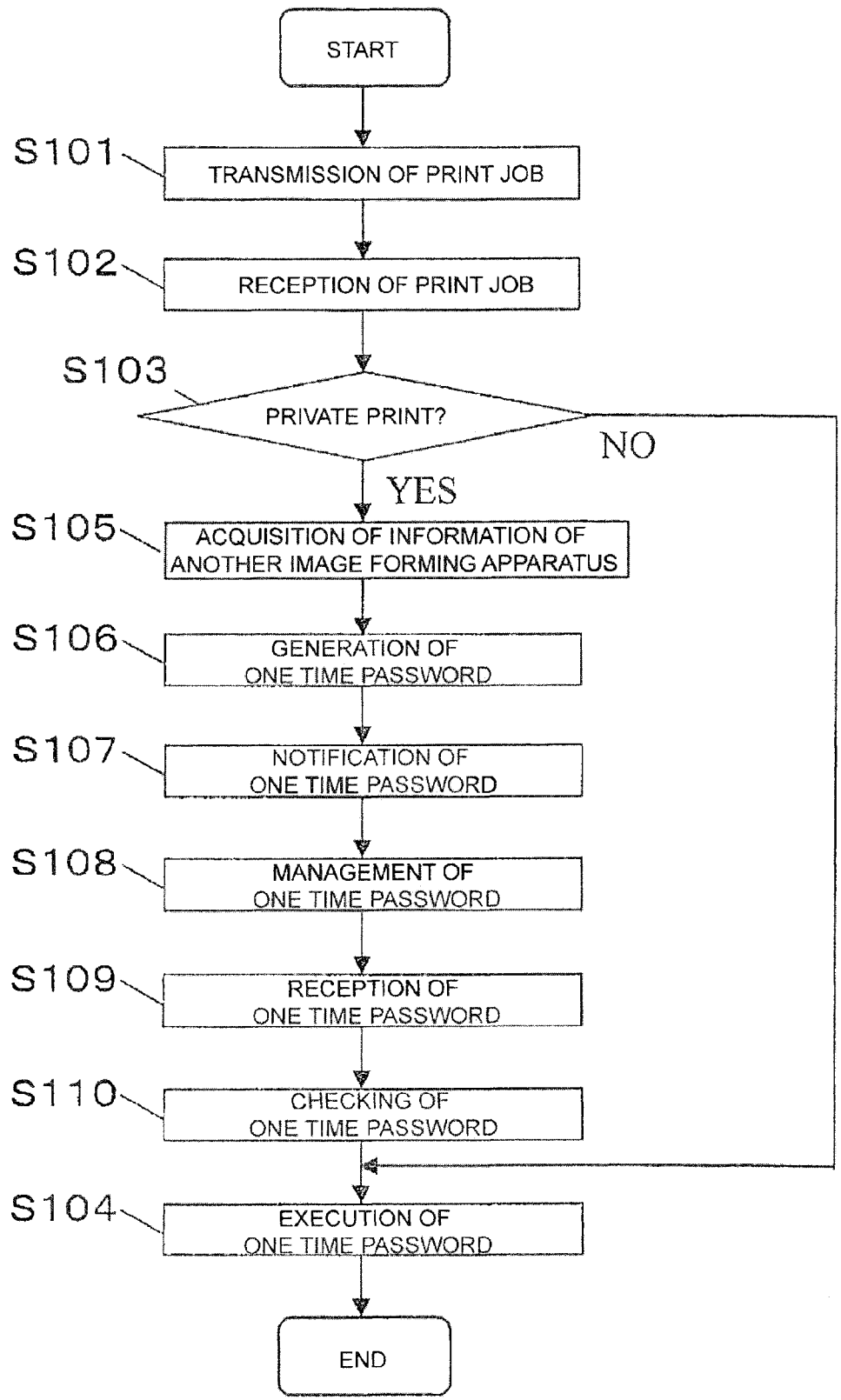

IMAGE FORMING APPARATUS AND IMAGE FORMING METHOD

INCORPORATION BY REFERENCE

The disclosure of Japanese Patent Application No. 2014-132457 filed on Jun. 27, 2014, including the specification, drawings and abstract is incorporated herein by reference in its entirety.

BACKGROUND

This disclosure relates to an image forming apparatus and an image forming method.

Conventionally, in an office, such as a company office, a business office, and the like, data, such as a document, and the like, is managed in a unified manner by an image forming apparatus, and a user inputs and outputs data to and from a personal computer connected thereto via a local area network (LAN), or the like, and thus, performs printing of necessary data.

In such an image forming apparatus, there is a possibility that any user may see and print data managed by the image forming apparatus, and therefore, a problem of leakage of confidential document and confidential information arises.

In order to solve the above-described problem, as a typical image forming apparatus, an image printing apparatus including a storage section that stores image data, a checking section that checks a password input by a user, and a print section that performs, when the checking section has authenticated the password, print of the image data is known. The above-described device is characterized by including a password issuance section that issues a password valid for only a single print job to a user. The password is a one time password and is generated on the basis of a machine number of the image forming apparatus and numerical values of a print number counter. The orders of the numerical values are shuffled, as appropriate, thereby increasing a security level. Thus, even when a password is leaked or stolen, printing of a confidential document may be limited.

SUMMARY

According to an aspect of the present disclosure, an image forming apparatus includes a determination section, an acquisition section, a generation section, a notification section, and a management section. The determination section determines, when receiving a print job from a predetermined terminal apparatus via a network, whether or not the print job is a private print job. If the print job is a private print job, the acquisition section acquires, from another image forming apparatus coupled to a self-apparatus to communicate with the self-apparatus, information regarding the another image forming apparatus. The generation section generates a one time password on the basis of the acquired information. The notification section notifies the terminal apparatus of the generated one time password. The management section manages the generated one time password in association with the private print job and, when receiving the one time password from a user, executes the private print job associated with the one time password.

BRIEF DESCRIPTION OF THE DRAWINGS

FIG. 3 is a flow chart illustrating execution procedures according to an embodiment of the present disclosure.

DETAILED DESCRIPTION

An embodiment will be described below with reference to the accompanying drawings to help understanding the present disclosure. Note that the embodiment below is a specific example of the present disclosure and does not limit the technical scope of the present disclosure. In the flow chart, an alphabet S added before each numerical character means a step.

As an example of the embodiment of the present disclosure, an image forming apparatus will be described. Note that an image forming apparatus according to the present disclosure is, for example, a multi function peripheral (MFP) including functions of a copy machine, a scanner, a printer, and the like.

Figure 1:
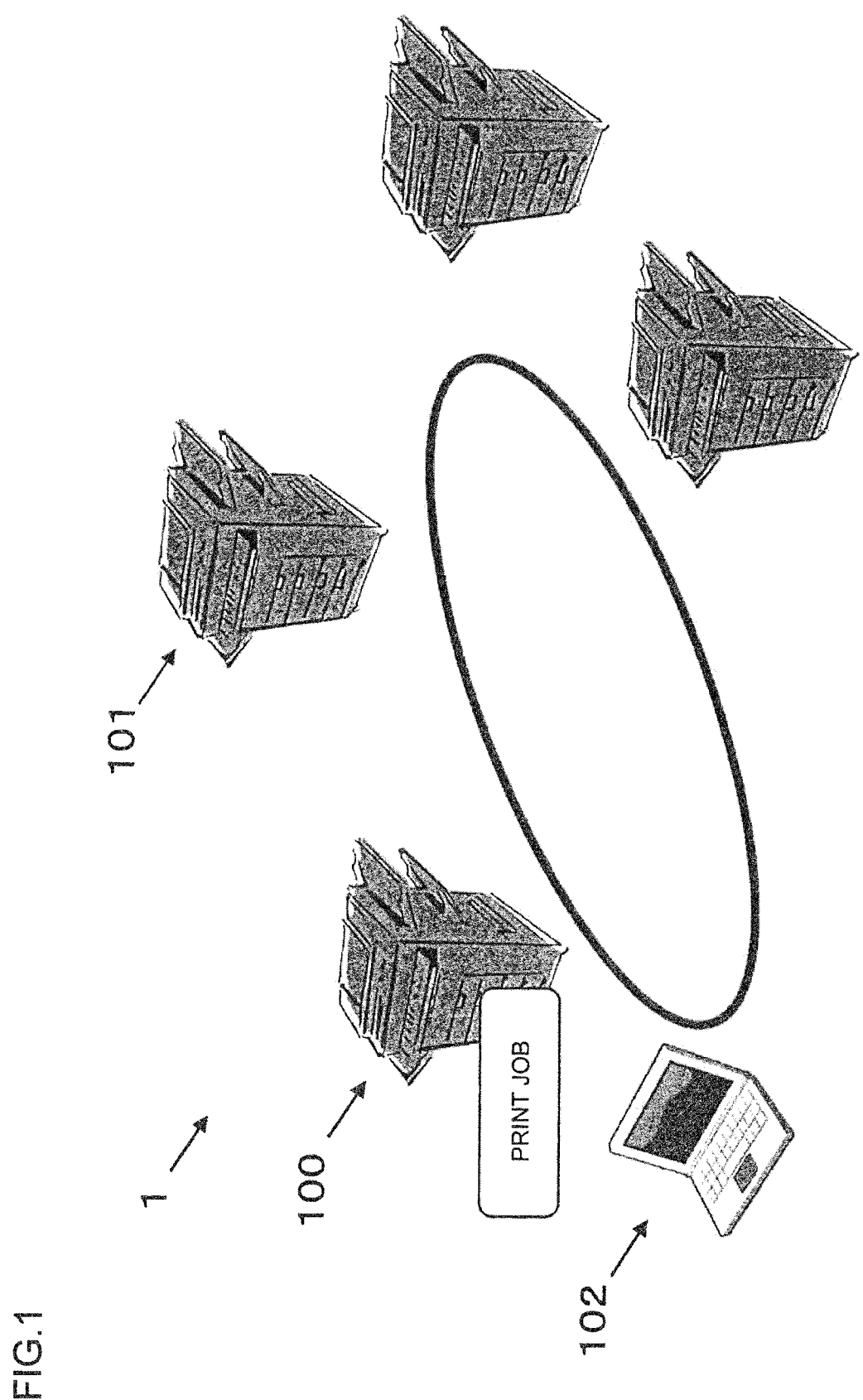
FIG. 1 is a schematic view of a multifunction peripheral, other image forming apparatuses, and a terminal apparatus according to an embodiment of the present disclosure.

As illustrated in FIG. 1, a multifunction peripheral 100 is coupled to each of other image forming apparatus 101 and a terminal apparatus 102 via a network. A user places an original on an original platen and inputs a predetermined setting condition, and thereby, the multifunction peripheral 100 executes image forming on the basis of image data of the original. The other image forming apparatuses 101 also have similar functions to those of the multifunction peripheral 100. The terminal apparatus 102 is, for example, a personal computer, a tablet terminal apparatus, a notebook computer, or a mobile terminal apparatus, and a user may generate a print job including predetermined image data and a predetermined setting condition and transmit the print job to the multifunction peripheral 100.

Note that a control circuit of each of the multifunction peripheral 100, the other image forming apparatuses 101, and the terminal apparatus 102 is not illustrated, but respective drivers corresponding to driven sections, such as a central processing unit (CPU), a read only memory (ROM), a random access memory (RAM), and a hard disk drive (HDD), are coupled via an internal bus. The CPU of each of the multifunction peripheral 100, the other image forming apparatuses 101, and the terminal apparatus 102, for example, utilizes the RAM as a working area, executes a program stored in the ROM, the HDD, or the like, receives data, an instruction, an order, or the like, from the driver on the basis of the execution result, and controls an operation of each driven section related to execution of a print job. As for each section (illustrated in FIG. 2) other than the driven section, which will be described later, the CPU executes each program to realize the each section. A program and data that realize each section, which will be described below, is stored in the ROM, the RAM, the HDD, and the like.

Figure 2:
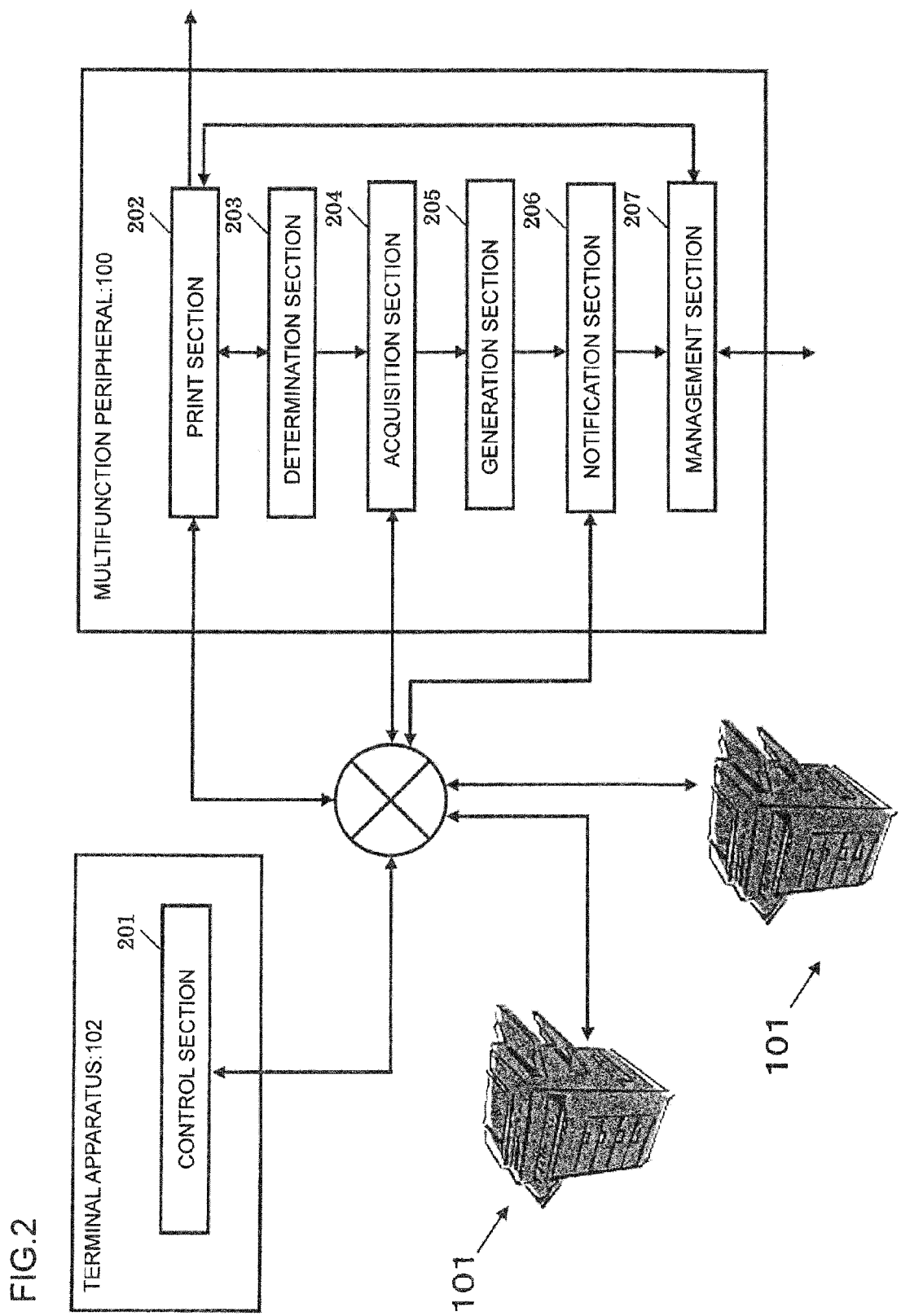
FIG. 2 is a functional block diagram of a multifunction peripheral, other image forming apparatuses, and a terminal apparatus according to an embodiment of the present disclosure.

Next, a configuration and execution procedures according to an embodiment of the present disclosure will be described below with reference to FIG. 2 and FIG. 3. First, using a self terminal apparatus 102, a user creates predetermined image data (a confidential document) and a predetermined setting condition (for example, private print, or the like), creates a print job including the image data and the setting condition, and inputs a transmission instruction to a desired image forming apparatus (the multifunction peripheral 100). Then, a control section 201 of the terminal apparatus 102 receives the print job and transmits the print job to the multifunction peripheral 100 via a network (S101 in FIG. 3).

On receiving the print job, a print section 202 of the multifunction peripheral 100 that received the print job receives the print job (S102 in FIG. 3) notifies a determination section 203 of the reception of the print job. The determination section 203 that received the notification determines whether or not the print job is a private print job (S103 in FIG. 3).

As a result of the determination, if the print job is not a private print job (No in S103 in FIG. 3), the determination section 203 notifies the print section 202 that the print job is not a private print job, and the print section 202 that received the notification executes image forming on the basis of the print job (S104 in FIG. 3). In this case, a normal print job is executed.

On the other hand, in S103, as a result of the determination, if the print job is a private print job (YES in S103 in FIG. 3), the determination section 203 notifies an acquisition section 204 that the print job is a private print job. The acquisition section 204 that received the notification acquires, from the other image forming apparatuses 101 that are coupled to the multifunction peripheral 100 via a network so as to be communicable with the multifunction peripheral 100, information regarding the other image forming apparatuses 101 (S105 in FIG. 3).

A method that the acquisition section 204 employs to acquire the information is not particularly limited. For example, when the acquisition section 204 acquires, as the information, serial numbers of the other image forming apparatuses 101, the following method is employed. That is, the acquisition section 204 acquires, as operational information, a current print number (for example, thirty sheets) from the self multifunction peripheral 100, and inputs the acquired print number of the multifunction peripheral 100 as a seed value of a random number generation section provided in advance. Then, a random number based on the seed value (the print number) is generated by the random number generation section, and therefore, the acquisition section 204 selects one of the plurality of other image forming apparatuses 101 coupled to the network on the basis of the generated random number. For example, the acquisition section 204 acquires a number (for example, two) in the last digit from the random number, furthermore, numbers the plurality of other image forming apparatuses 101 in order in accordance with a predetermined rule (for example, a MAC address, or the like), and selects one of the other image forming apparatuses 101 with the order (second) corresponding to the acquired number. Then, the acquisition section 204 acquires, as information, a serial number of the selected one of the other image forming apparatuses 101 from the selected one of the other image forming apparatuses 101.

In the manner described above, a random number is generated using a value, such as the print number of the self multifunction peripheral 100, and the like, which may vary with time, and another image forming apparatus 101 is selected on the basis of the random number, so that, even when a third person knows this mechanism, a random number generation pattern is not fixed, and thus, duplication of a one time password may be reliably reduced.

When the acquisition section 204 has completed acquisition of the serial number, the acquisition section 204 notifies a generation section 205 that the acquisition section 204 has completed the acquisition of the serial number, and the generation section 205 that received the notification generates a one time password on the basis of the acquired information (S106 in FIG. 3).

A method that the generation section 205 employs to generate a one time password herein is not particularly limited. For example, the generation section 205 generates a one time password using the information (the serial number of the selected one of the other image forming apparatuses 101 in the above-described example) as the seed value. Thus, the one time password is generated on the basis of information regarding another image forming apparatuses 101, not information regarding the self multifunction peripheral 100, so that, even when a third person knows this mechanism, it is very difficult to reproduce the generated one time password and thus duplication of the one time password may be reliably reduced. Also, a one time password having a more secure security level than a conventional security level may be generated without using a special apparatus and also without imposing an expense burden. Even when a third person knows a method for generating a one time password and a mechanism thereof, information of the multifunction peripheral 100 for which a print job was instructed, which varies with time, and information of another image forming apparatus 101 coupled to the multifunction peripheral 100, which varies with time, are not known, and therefore, duplication of a one time password may be reliably reduced.

When the generation section 205 has completed the generation of a one time password, the generation section 205 notifies a notification section 206 of the completion of the generation of a one time password, the notification section 206 that received the notification notifies the terminal apparatus 102 that transmitted the private print job of the generated one time password (S107 in FIG. 3).

A method that the notification section 206 employs to notify a generated one time password herein is not particularly limited, but, for example, the notification section 206 causes the terminal apparatus 102 to display a one time password notification screen indicating a one time password for the private print job, for example, in a pop-up format. Thus, the user may recognize the one time password for the private print job.

When the notification section 206 has completed notification of the one time password, the notification section 206 notifies a management section 207 of the completion of the notification, the management section 207 that received the notification manages the generated one time password in association with the private print job (S108 in FIG. 3).

A method that the management section 207 employs to manage a generated one time password herein is not particularly limited, but, for example, the management section 207 acquires a private print job (including image data and a setting condition) from the print section 202 and stores the acquired private print job in association with the generated one time password in a predetermined table.

On the other hand, when the user recognizes the one time password with the terminal apparatus 102, the user makes a note of the one time password, goes to the multifunction peripheral 100, and instructs execution of a private print job via a predetermined operation section. Then, the management section 207 of the multifunction peripheral 100 displays a one time password input screen to the user via the operation section to urge the user to input the one time password.

When the user inputs the one time password from the one time password input screen, the management section 207 receives the one time password (S109 in FIG. 3) and checks the one time password with the one time passwords stored in the table (S110 in FIG. 3).

In this case, if the input one time password corresponds to one of the one time passwords stored in the table, the management section 207 causes the print section 202 to execute a private print job associated with the input one time password (S104 in FIG. 3). That is, the print section 202 executes image forming on the basis of the private print job. Thus, even for a confidential document and confidential information, the user is enabled to execute the private print job using the one time password that is difficult for a third person to reproduce. In this case, a more secure security level may be achieved.

Incidentally, as described above, in S105, the acquisition section 204 uses the print number of the self multifunction peripheral 100 as the seed value for a random number, and then, selects another image forming apparatus 101, but another method may be employed. For example, the acquisition section 204 may acquire, from another image forming apparatus 101, operational information (for example, use frequency and a print number) of the another image forming apparatus 101 as information used for generating a random number, and may select another image forming apparatus 101 using the acquired operational information as the seed value for the random number. Thus, by generating a random number using operational information that it is more difficult to estimate than the serial number of another image forming apparatus 101, duplication of a one time password may be further reduced.

Furthermore, in order to increase randomness of the generation of a one time password, the acquisition section 204 may use information corresponding to a load status of a network as the seed value for generation of a random number, and then, may select another image forming apparatus 101. For example, the acquisition section 204 issues a ping command to a predetermined another image forming apparatus 101, receives a response to the ping command from the another image forming apparatus 101, and uses a response time for the ping command as the seed value for generation of a random number. In this case, the response time for the ping command varies in accordance with a time-to-time load status of the network, and therefore, a unique numerical value that has substantially no reproducibility may be achieved. Therefore, a generated one time password is substantially non-reproducible, and furthermore, a security level may be increased.

Note that, in the above-described embodiment of the present disclosure, the multifunction peripheral 100 includes each section, but a configuration in which a program that realizes the each section is stored in a storage medium and the storage medium is provided may be employed. In the configuration, an image forming apparatus is caused to read out the program and the image forming apparatus realizes the each section. In this case, the program itself, which has been read out from the recording medium, has advantages of the present disclosure. Furthermore, a method for storing a step executed by each section in a hard disk may be also provided.

As has been described above, an image forming apparatus and an image forming method according to the present disclosure are useful for an image forming apparatus, such as a copy machine, a printer, a scanner, and the like, as well as a multifunction peripheral, of course, and are effective as an image forming apparatus and an image forming method that allow the generation of a one time password with a more secure security level.

What is claimed is:

1. An image forming apparatus comprising:
    a determination section configured to determine, when receiving a print job from a predetermined terminal apparatus via a network, whether or not the print job is a private print job;
    an acquisition section configured to, if the print job is a private print job, acquire, from another image forming apparatus coupled to the image forming apparatus so as to be communicable with the image forming apparatus, information regarding the another image forming apparatus;
    a generation section configured to generate a one time password on the basis of the acquired information;
    a notification section configured to notify the terminal apparatus of the generated one time password; and
    a management section configured to manage the generated one time password in association with the private print job and, when receiving the one time password from a user, execute the private print job associated with the one time password.

2. The image forming apparatus according to claim 1, wherein the acquisition section generates a random number using operational information of the image forming apparatus, operational information of other image forming apparatuses, or information corresponding to a load status of the network, selects one of the other image forming apparatuses on the basis of the generated random number, and acquires, from the selected one of the other image forming apparatuses, information regarding the selected image forming apparatus.

3. An image forming method of an image forming apparatus, the method comprising the steps of:
    determining, when receiving a print job from a predetermined terminal apparatus via a network, whether or not the print job is a private print job;
    acquiring, from another image forming apparatus coupled to the image forming apparatus so as to be communicable with the image forming apparatus, information regarding the another image forming apparatus, if the print job is a private print job;
    generating a one time password on the basis of the acquired information;
    notifying the terminal apparatus of the generated one time password; and
    managing the generated one time password in association with the private print job and, when receiving the one time password from a user, executing the private print job associated with the one time password.

* * * * *